United States Patent [19]
Chan

[11] 3,821,863
[45] July 2, 1974

[54] CONTROLLED FERTILIZER FEEDER
[76] Inventor: See Fong Chan, 47-09 Newton Rd., Astoria, N.Y. 11103
[22] Filed: June 21, 1973
[21] Appl. No.: 372,205

[52] U.S. Cl. .................................................. 47/48.5
[51] Int. Cl. ............................................ A01g 29/00
[58] Field of Search ............ 47/1, 48.5, 37; 71/64 X

[56] References Cited
UNITED STATES PATENTS

| | | | |
|---|---|---|---|
| 349,874 | 9/1886 | Buhrer | 47/48.5 |
| 563,921 | 7/1896 | Gridley | 47/48.5 UX |
| 718,380 | 1/1903 | Patterson | 47/48.5 |
| 1,530,109 | 3/1925 | Cummings | 47/48.5 X |
| 1,948,117 | 2/1934 | Kadow | 47/48.5 |
| 2,145,934 | 2/1939 | Kingman | 47/48.5 |
| 2,931,140 | 4/1960 | Laffler et al. | 47/48.5 |
| 3,057,713 | 10/1962 | Gessler | 71/64 |
| 3,060,012 | 10/1962 | Pavek | 71/64 |

FOREIGN PATENTS OR APPLICATIONS

191,175  8/1937  Switzerland

*Primary Examiner*—Robert E. Bagwill

[57] ABSTRACT

A plant irrigating and feeding control device in several embodiments of invention. In both forms a tapered container adapted to be easily pushed into the ground is subdivided into two compartments, a top compartment containing a source of ground fertilizer and serving to meter the fertilizer outflow as a protection against excess fertilization, and a bottom compartment containing additional plant nutrients. A sleeve disposed about the top compartment having apertures therein adapted for partical alignment with apertures in the compartment provides the desired fertilization control. In both forms of invention the top and bottom compartments serve as a source of air to supply oxygen to the soil containing the roots of plants nourished thereby.

8 Claims, 3 Drawing Figures

PATENTED JUL 2 1974
3,821,863
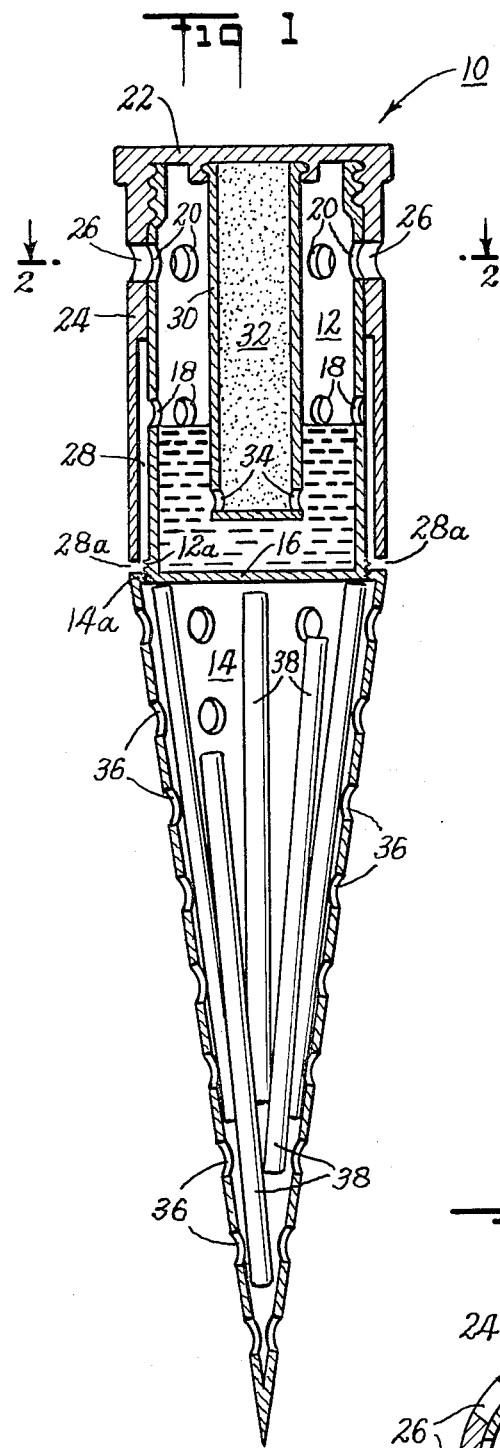
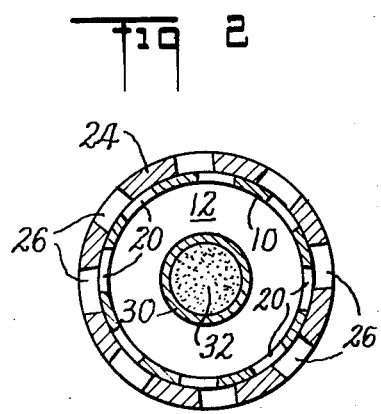

CONTROLLED FERTILIZER FEEDER

The invention relates to ground feeding devices which dispense plant fertilizer being adapted to be driven into the ground so as to permit the fertilizer to be washed therefrom on ground irrigation.

It is known that fertilization of the ground for the feeding of plant life should be effected in a controlled manner in as much as over fertilization is harmful to the plant. The present invention contemplates means for controlling or metering the flow of fertilizer into the ground so as to preclude excessive fertilization. The preferred embodiments represent to this extent an improvement over those devices which are disclosed, for example, in U.S. Pat. No. 718,380 and U.S. Pat. No. 2,145,934.

One object of the invention is to provide an effective ground fertilizing device capable of dispensing a controlled amount of fertilizer into the ground proximate the roots of plants and the like.

Other objects and advantages of the invention may be appreciated on reading the following description of two embodiments of the invention which is taken in conjunction with the drawings, in which:

FIG. 1 is a longitudinal section of the invention showing showing the compartmented ground fertilizing device as a preferred embodiment thereof;

FIG. 2 is a cross section taken on the line 2—2 of FIG. 1 showing the controlling aperture relationship of the principal components; and FIG. 3 is a longitudinal section similar to FIG. 1 showing a modified form of the invention.

Referring to the drawings there is shown a conical member 10 having a top compartment 12 with a bottom closure 16, the compartment 12 being externally threaded in its lower portion at 12a. The member 10 also has a bottom compartment 14 having an internally threaded top aperture 14a, the two compartments being separable and threadably connected within said aperture. The compartment 12 is provided with a lower row of annularly arranged apertures 18 located approximately midway between the top and bottom of the compartment 12 and an upper row of apertures 20 similarly arranged. Depending from cap 22 and threadably engaging the compartment 12 is a sleeve 24. The latter is provided with an annular row of apertures 26 located at the same level as the apertures 20 in the top compartment so that on rotation of the sleeve they may be partially aligned therewith to permit the entry of a controlled amount of ground water, but to discourage penetration of the device by plant roots, see FIG. 2. The lower portion of the sleeve 24 is channeled to form a peripheral passageway 28 between the compartment 12 and the sleeve 24, the liquid fertilizer flowing into the passageway from the overflow apertures 18 and out into the ground through annular orifice 28a.

Canister 30 which is removably and dependently connected to the cap 22 contains a plant fertilizer 32 such as a potassium nitrate and phosphate. The canister 30 is provided with apertures 34 at its bottom end which communicate with the compartment 12 when the canister is assembled as shown.

The bottom compartment 14 is conventionally apertured at 36 and contains iron bars 38 which provide a source of iron rust being recognized as a salubrious food for plant life. It also serves together with the top compartment to supply oxygen to the soil in which the plant roots grow.

In use, the fertilizing device is driven into the ground, the top compartment 12 is filled with water just below apertures 18 and the cap 22 is thereafter screwed onto the compartment 12 whereby the chemical containing canister 30 is assembled in place. As the ground is then watered, the water will flow into both compartments 12 and 14 through apertures 20, 26 and 36 respectively. As the water level rises in compartment 12 above the apertures 18, the water will flow out through the passageway 28 and the orifice 28a carrying with it a measured amount of fertilizer from the top compartment 12 and a small amount of ferric oxide from the bottom compartment 14 after oxidation of the bars 38 has occurred.

In the second embodiment of the invention as shown in FIG. 3, apertured conical member 40 is composed of a top compartment 42 and a bottom compartment 44. A container 46 fabricated of porous paper or woven cloth and containing a chemical fertilizer is disposed in the top compartment. Sleeve 48 having a single row of apertures 50 is disposed about the compartment 42 and is used to control the amount of ground water entering the compartment 42 for washing out the fertilizer through apertures 52 in the member 40 and out through annular passageway 54 and annular orifice 56 provided between the sleeve 48 and the member 40 and into the ground for feeding plant roots. A cap 58 which is screwed onto the sleeve 48 and is integral therewith serves to turn the sleeve relative to the member 40 to effect the desired fertilizer control by partially aligning the apertures 50 and 52 to a predetermined extent. The bottom compartment 44 may be employed for ground aeration.

Various modifications may be effected in the invention without departing from the scope and principle thereof as defined in the appended claims.

I claim:

1. A ground fertilizing device comprising a first compartment having a continuous side wall and bottom wall integral therewith, a second compartment having a continuous side wall, the upper end of which is secured to said bottom wall, and the lower end of which tapers to a point to facilitate ground insertion of said device, said side walls of said compartments having spaced apertures therein, a cap rotatably secured to the first compartment side wall, said first compartment side wall, bottom wall and cap enclosing means for holding fertilizer, said cap having an apertured sleeve depending therefrom and surrounding said first compartment, said sleeve and side wall apertures being registrable upon rotation of said cap.

2. A device as in claim 1, wherein said fertilizer holding means is a container secured to the inner face of said cap.

3. A device as in claim 1, wherein said container is a water impermeable canister having apertures in the lower portion thereof.

4. A device as in claim 1, wherein said container is fabricated of a water permeable material.

5. A device as in claim 1, wherein said first compartment is generally cylindrical and said second compartment is conical.

6. A device as in claim 1, wherein said device is conical.

7. A device as in claim 1, wherein said fertilizer holding means contains water soluble fertilizer.

8. A device as in claim 7, wherein said second compartment contains iron bodies, which upon being exposed to soil air and moisture, will yield ferric oxide.

* * * * *